United States Patent
Hayashi et al.

(10) Patent No.: US 9,625,962 B2
(45) Date of Patent: Apr. 18, 2017

(54) COOLING SYSTEM AND ELECTRONIC DEVICE

(71) Applicant: FUJITSU LIMITED, Kawasaki-shi, Kanagawa (JP)

(72) Inventors: Nobuyuki Hayashi, Yokohama (JP); Teru Nakanishi, Isehara (JP); Takahiro Kimura, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/726,788

(22) Filed: Jun. 1, 2015

(65) Prior Publication Data

US 2016/0011635 A1 Jan. 14, 2016

(30) Foreign Application Priority Data

Jul. 11, 2014 (JP) ................................. 2014-143345

(51) Int. Cl.
*G06F 1/20* (2006.01)

(52) U.S. Cl.
CPC ................ *G06F 1/20* (2013.01); *Y02B 30/72* (2013.01)

(58) Field of Classification Search
CPC .. F28D 15/0266; F25B 49/02; H05K 7/20327
USPC ..... 361/679.53; 165/104.19, 104.27, 104.32, 165/103
See application file for complete search history.

(56) References Cited

U.S. PATENT DOCUMENTS

| 2012/0043059 | A1* | 2/2012 | Xu | F28D 15/0266 |
| | | | | 165/104.26 |
| 2012/0180993 | A1* | 7/2012 | Yoshikawa | H01L 23/427 |
| | | | | 165/104.21 |
| 2012/0273167 | A1* | 11/2012 | Xiang | H01L 23/427 |
| | | | | 165/104.26 |
| 2012/0324933 | A1* | 12/2012 | Louvar | H05K 7/20327 |
| | | | | 62/196.4 |
| 2013/0233521 | A1* | 9/2013 | Uchida | F28D 15/0266 |
| | | | | 165/104.26 |

FOREIGN PATENT DOCUMENTS

| JP | 7-14015 | 4/1995 |
| JP | 2012-132613 | 7/2012 |

* cited by examiner

*Primary Examiner* — Tuan T Dinh
*Assistant Examiner* — Mukund G Patel
(74) *Attorney, Agent, or Firm* — Fujitsu Patent Center

(57) ABSTRACT

A cooling system includes: an evaporator; a condenser; a feed pipe including a feed pipe body configured to couple an opening portion within the evaporator and the condenser, at least a portion of the feed pipe body in a longitudinal direction having an inner cross-sectional area smaller than an inner cross-sectional area of the opening portion; a return pipe configured to couple the condenser and the evaporator; and a bypass pipe configured to couple the evaporator and the feed pipe body.

18 Claims, 16 Drawing Sheets

COOLING SYSTEM AND ELECTRONIC DEVICE

CROSS-REFERENCE TO RELATED APPLICATION

This application is based upon and claims the benefit of priority from the prior Japanese Patent Application No. 2014-143345 filed on Jul. 11, 2014, the entire contents of which are incorporated herein by reference.

FIELD

Embodiments discussed herein are related to a cooling system and an electronic device.

BACKGROUND

A cooling system cools a heat generating element such as an electronic part.

Related technologies are disclosed in, for example, Japanese Laid-Open Patent Publication No. 2012-132613 or Japanese Utility Model Publication No. H7-14015.

SUMMARY

According to one aspect of the embodiments, a cooling system includes: an evaporator; a condenser; a feed pipe including a feed pipe body configured to couple an opening portion within the evaporator and the condenser, at least a portion of the feed pipe body in a longitudinal direction having an inner cross-sectional area lamer than an inner cross-sectional area of the opening portion; a return pipe configured to couple the condenser and the evaporator; and a bypass pipe configured to couple the evaporator and the feed pipe body.

The object and advantages of the invention will be realized and attained by means of the elements and combinations particularly pointed out in the claims. It is to be understood that both the foregoing general description and the following detailed description are exemplary and explanatory, and are not restrictive of the invention as claimed.

DESCRIPTION OF EMBODIMENTS

For example, a cooling system for cooling a heat generating element such as an electronic part includes a cooling system which is provided with an evaporator and a condenser, and a feed pipe and a return pipe coupling the evaporator and the condenser with each other.

In the cooling system, vapor, which is generated within the evaporator as a coolant in the evaporator is vaporized due to the heat from the heat generating element, is conveyed from the evaporator to the condenser via the feed pipe. In the condenser, the vapor conveyed via the feed pipe is liquefied, and the coolant liquefied in the condenser is returned from the condenser to the evaporator via the return pipe. Since the coolant is circulated between the evaporator and the condenser, the heat from the heat generating element is transported from the evaporator to the condenser by the coolant so that the heat generating element is cooled.

For example, in the cooling system described above, when the vapor pressure within the evaporator increases with an increase of a calorific value of the heat generating element, the boiling point of the coolant within the evaporator also increases. When the vapor pressure within the evaporator increases to increase the boiling point of the coolant within the evaporator, the evaporation amount of the coolant is decreased. For that reason, a cooling performance for the heat generating element may be degraded.

Figure 1:
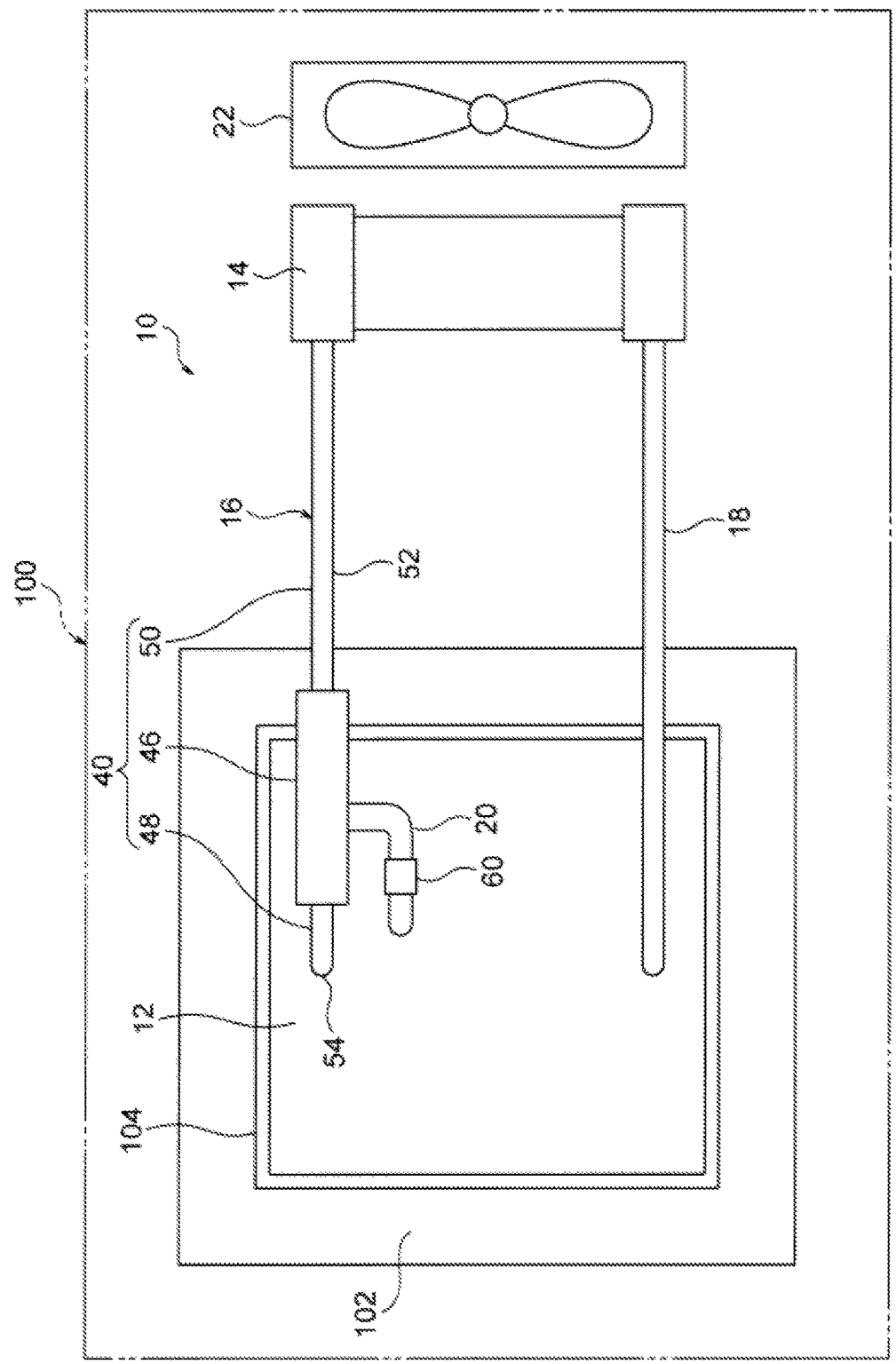
FIG. 1 illustrates an exemplary plan view of an electronic device provided with a cooling system.
Figure 2:
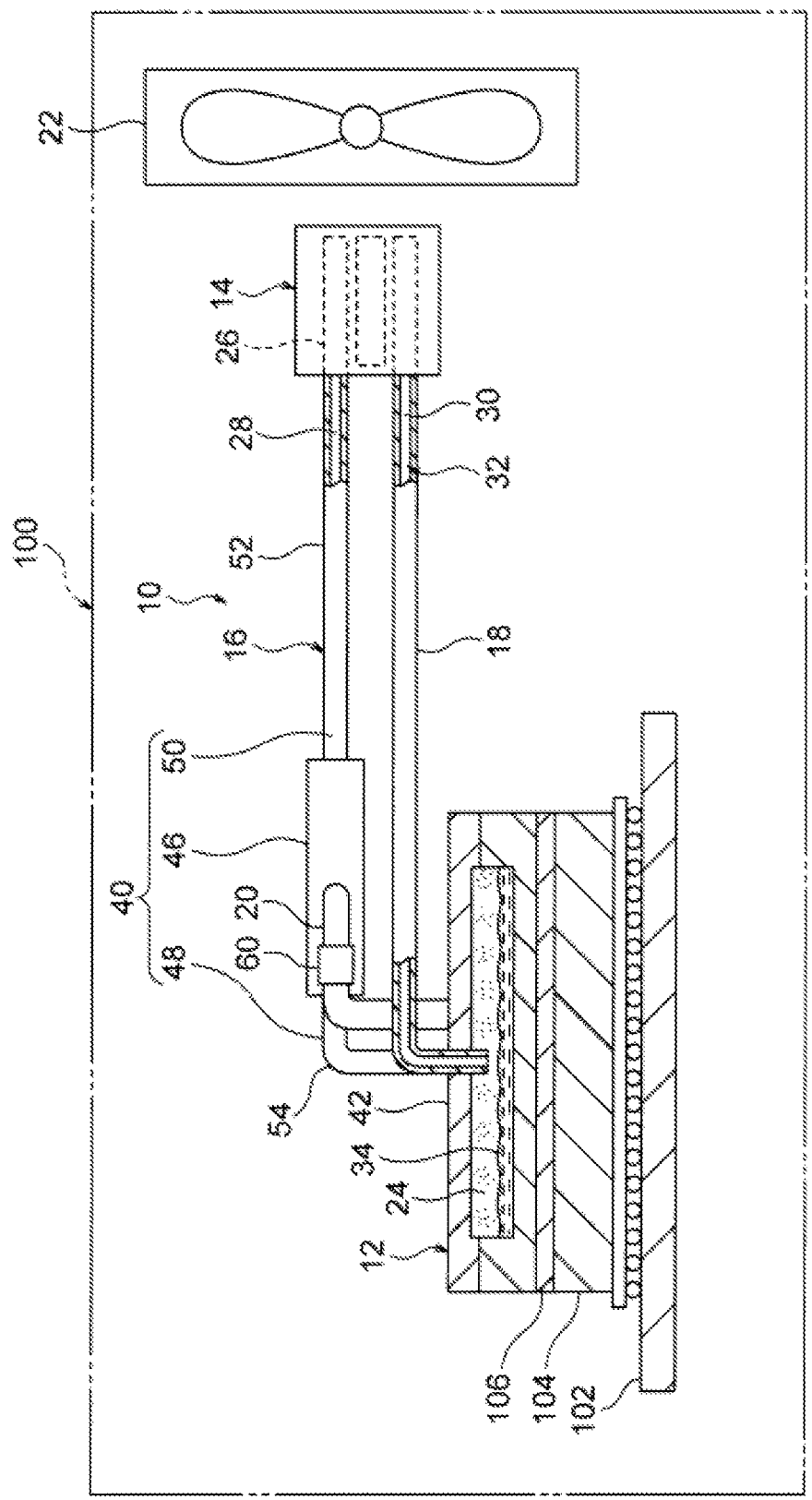
FIG. 2 illustrates an exemplary side view of an electronic device provided with a cooling system in which a partial cross section is included.

FIG. 1 is an exemplary plan view of an electronic device provided with a cooling system. FIG. 2 is an exemplary side view of an electronic device provided with a cooling system in which a partial cross section is included. The electronic device 100 illustrated in FIGS. 1 and 2 may be, for example, a server. The electronic device 100 is provided with a circuit board 102. An electronic part 104 as an example of the "heat generating element" may be mounted on the circuit board 102. The electronic part 104 may be, for example, a semiconductor element such as a central processing unit (CPU) that generates heat with the operation thereof.

The electronic device 100 is provided with a cooling system 10 configured to cool the electronic part 104. The cooling system 10 is provided with an evaporator 12, a condenser 14, a feed pipe 16, a return pipe 18, a bypass pipe 20, and a blower 22.

As illustrated in FIG. 2, the evaporator 12 may be formed in a flat box shape. The evaporator 12 may be thermally coupled with the electronic part 104 with a connection member 106 being interposed therebetween.

An evaporation chamber 24 is formed inside the evaporator 12, and a condensing flow path 26 is formed inside the condenser 14. The evaporator 12 and the condenser 14 are coupled with each other via the feed pipe 16 and the return pipe 18. The evaporation chamber 24 and the condensing flow path 26 are communicated with each other through a feed flow path 28 formed inside the feed pipe 16 and a return flow path 30 formed inside the return pipe 18.

The evaporation chamber 24, the condensing flow path 26, the feed flow path 28, and the return flow path 30 form a circulation circuit 32 of a closed loop type. A coolant 34 (working liquid) is accommodated in the circulation circuit 32. The coolant 34 may be introduced into the circulation circuit 32 under a reduced pressure, or under the atmospheric pressure. As for the coolant 34, for example, pure water, a liquid obtained by mixing ethanol with the pure water, or a fluorine-containing liquid may be used.

An opening diameter of the feed pipe 16 opened to the inside of the evaporator 12 may be set to be larger than an opening diameter of the return pipe 18 opened to the inside of the evaporator 12. Thus, when the coolant 34 is vaporized in the evaporator 12, the coolant 34 moves from the evaporator 12 to the condenser 14 via the feed pipe 16, among the feed pipe 16 and the return pipe 18.

The blower 22 is disposed adjacent to the condenser 14. Upon being operated, the blower 22 forms a cooling air flow that cools the condenser 14.

Figure 3:
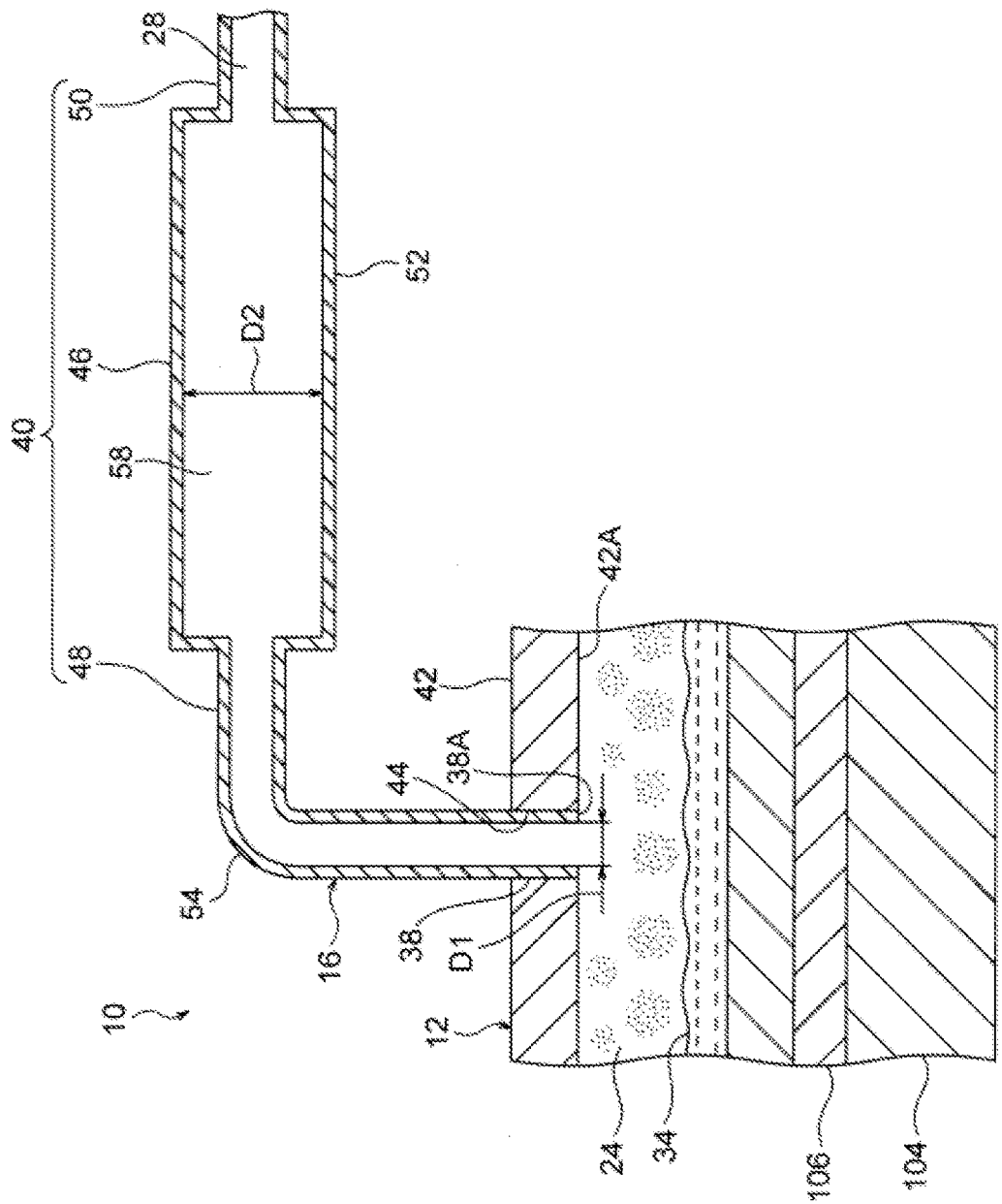
FIG. 3 illustrates an exemplary vertical cross-section of an evaporator and a feed pipe.

FIG. 3 illustrates an exemplary vertical cross-sectional view of an evaporator and a feed pipe. The feed pipe 16 may have, for example, a structure as follows. For example, as illustrated in FIG. 3, the feed pipe 16 includes a cylindrical opening portion 38, and a feed pipe body 40 of a circular tube shape. A cross-sectional shape of the inside of the entire feed pipe 16 including the opening portion 38 and the feed pipe body 40 may be a circular shape.

In a top wall portion 42 which is opposite to the electronic part 104 side in the evaporator 12, a communication hole 44 is formed so as to pass through the top wall portion 42. The communication hole 44 is communicated with the evaporation chamber 24. The cylindrical opening portion 38 is inserted into (fitted to) the communication hole 44 and opened to the inside of the evaporator 12 (evaporation chamber 24). The portion of the feed pipe 16 inserted into the communication hole 44 is the opening portion 38. A front end 38A of the opening portion 38 may be coplanar with an inner face 42A of the top wall portion 42. The entire inner diameter of the opening portion 38 including the opening diameter on the evaporation chamber 24 side in the opening portion 38 (the opening diameter of the opening portion 38 opened to the inside of the evaporator 12) is D1. The inner diameter D1 may be constant along the axial direction of the opening portion 38.

The feed pipe body 40 couples the opening portion 38 and the condenser 14 with each other (see, e.g., FIG. 2). The feed pipe body 40 includes an expansion portion 46 and general portions 48 and 50. The expansion portion 46 may have an inner diameter larger than that of the opening portion 38. For example, the inner diameter D2 of the expansion portion 46 may be larger than that of the opening portion 38. Since the inner diameter D2 of the expansion portion 46 is larger than the inner diameter D1 of the opening portion 38, the inner cross-sectional area of the expansion portion 46 (an area of a cross section orthogonal to the longitudinal direction) is larger than that of the opening portion 38. The general portions 48 and 50 may have an inner diameter which is smaller than that of the expansion portion 46 and substantially the same as that of the opening portion 38.

As illustrated in FIG. 1 or FIG. 2, the expansion portion 46 may be formed in a portion of the feed pipe body 40 in the longitudinal direction. The expansion portion 46 is formed, for example, at the evaporator 12 side rather than in the central portion of the feed pipe body 40 in the longitudinal direction. As illustrated in FIG. 3, the general portion 48 on the evaporator 12 side may be formed continuously to the opening portion 38. The general portion 48 on the evaporator 12 side is formed between the expansion portion 46 and the opening portion 38. As illustrated in FIG. 2, the general portion 50 on the condenser 14 side is formed between the expansion portion 46 and the condenser 14.

The feed pipe body 40 includes a straight portion 52 extending in a linear shape, and a bent portion 54 bent with respect to the straight portion 52. The expansion portion 46 may be formed in the straight portion 52. The bent portion 54 may be formed in the general portion 48 on the evaporator 12 side.

Figure 4:
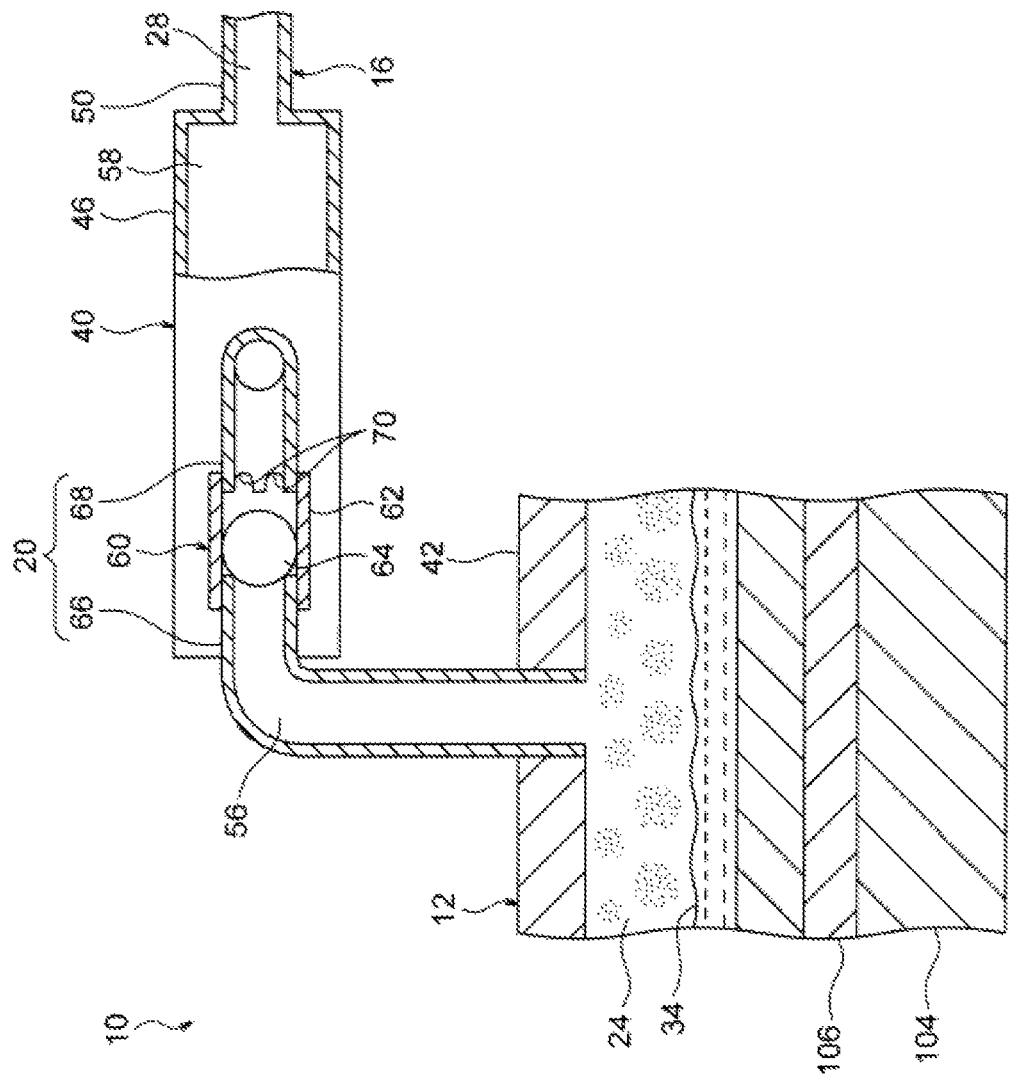
FIG. 4 illustrates an exemplary vertical cross-sectional view of an evaporator and a bypass pipe.

The bypass pipe 20 is provided in parallel with the feed pipe 16, and couples the evaporator 12 and the expansion portion 46 in the feed pipe body 40 with each other. FIG. 4 illustrates an exemplary vertical cross-sectional view of an evaporator and a bypass pipe. As illustrated in FIG. 4, a bypass flow path 56 is formed inside the bypass pipe 20, and the evaporation chamber 24 within the evaporator 12 and the inner space 58 of the expansion portion 46 are communicated with each other via the bypass flow path 56.

The bypass pipe 20 is provided with a pressure control valve 60. The pressure control valve 60 includes a cylindrical case 62 and a spherical valve body 64. The bypass pipe 20 is divided into an upstream pipe 66 and a downstream pipe 68, and the upstream pipe 66 and the downstream pipe 68 are coupled with each other via the case 62. The valve body 64 is accommodated in the case 62. The valve body 64 is movable in the axial direction of the case 62, and biased to the upstream pipe 66 side by an elastic member such as a coil spring.

Figure 5:
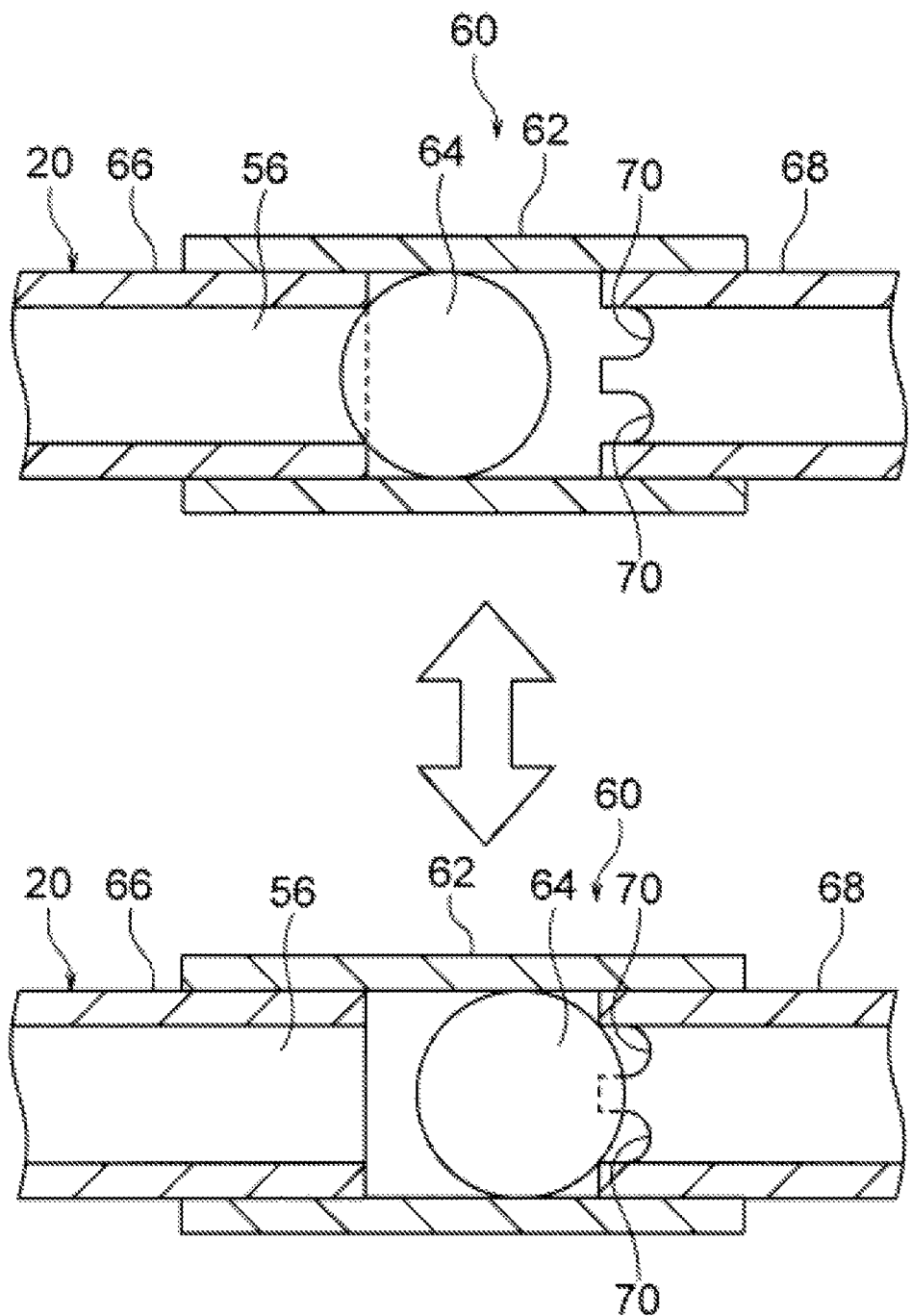
FIG. 5 illustrates an exemplary operation of a pressure control valve.

As illustrated in the upper drawing in FIG. 5, the valve body 64 blocks the opening at the downstream side of the upstream pipe 66 in a state where the valve body 64 is biased to the upstream pipe 66 side by the elastic member. For example, when the pressure within the upstream pipe 66 is lower than a certain pressure, the valve body 64 is biased to the upstream pipe 66 side by the elastic member, and the opening at the downstream side in the upstream pipe 66 is blocked by the valve body 64.

As illustrated in the lower drawing in FIG. 5, when the pressure within the upstream pipe 66 is equal to or higher than the certain pressure (working pressure), the valve body 64 moves toward the downstream pipe 68 side against the biasing force of the elastic member and is abutted against the upstream side end of downstream pipe 68. Notches 70 are formed on the upstream side end of the downstream pipe 68. In the state where the valve body 64 is abutted against the upstream side end of the downstream pipe 68, the inside of the upstream pipe 66 and the inside of the downstream pipe 68 are communicated with each other through the notches 70.

In the cooling system 10, when the electronic part 104 illustrated in FIG. 2 generates heat, the heat of the electronic part 104 is transferred to the evaporator 12 via the connection member 106. When the evaporator 12 is heated by the heat from the electronic part 104, the coolant 34 within the evaporator 12 is vaporized so that vapor is generated within the evaporator 12. The vapor is conveyed from the evaporator 12 to the condenser 14 via the feed pipe 16, for example, via the opening portion 38 and the feed pipe body 40.

When the electronic part 104 generates heat, the blower 22 operates. When the blower 22 operates, a cooling wind flow that cools the condenser 14 is formed and the heat is radiated from the condenser 14. In the condenser 14 where the heat is radiated, the vapor conveyed via the feed pipe 16 is liquefied. The coolant 34 liquefied in the condenser 14 is returned to the evaporator 12 from the condenser 14 via the return pipe 18.

As the coolant 34 is circulated between the evaporator 12 and the condenser 14, the heat from the electronic part 104 is transported from the evaporator 12 to the condenser 14 so that the electronic part 104 is cooled.

When the vapor pressure within the evaporator 12 increases with an increase of a calorific value of the electronic part 104, the boiling point of the coolant 34 within the evaporator 12 also increases. When the vapor pressure within the evaporator 12 increases and thus, the boiling point of the coolant 34 within the evaporator 12 increases, the evaporation amount of the coolant 34 is reduced, which may cause the cooling performance for the electronic part 104 to be degraded.

In the cooling system 10, the expansion portion 46 having an inner diameter larger than that of the opening portion 38 is formed in the feed pipe body 40, as illustrated in FIG. 3. Thus, even if the calorific value of the electronic part 104 increases, the vapor moves to the inside of the expansion portion 46 which has a pressure lower than that in the evaporator 12. Thus, the discharge of the vapor from the inside of the evaporator 12 is facilitated. Since the stay of the vapor within the evaporator 12 is reduced, an excessive pressure increase within the evaporator 12 may be reduced. Thus, the increase of the boiling point of the coolant 34 within the evaporator 12 is reduced so that the evaporation amount of the coolant 34 may be secured and the cooling performance for the electronic part 104 may be improved.

As illustrated in FIG. 4, in the cooling system 10, the evaporator 12 and the expansion portion 46 are coupled with each other via the bypass pipe 20. A pressure control valve 60 is provided between the upstream pipe 66 and the downstream pipe 68 of the bypass pipe 20. When the pressure within the upstream pipe 66 reaches or exceeds a certain pressure (working pressure) with an increase of the pressure within the evaporator 12, the pressure control valve 60 operates. When the pressure control valve 60 operates (see, e.g., FIG. 5), the inside of the upstream pipe 66 and the inside of the downstream pipe 68 of the bypass pipe 20 are communicated with each other.

When the calorific value of the electronic part 104 further increases, the vapor also moves from the evaporator 12 to the expansion portion 46 via the bypass pipe 20, in addition to the movement of the vapor from the evaporator 12 to the expansion portion 46 through the opening portion 38 and the general portion 48 (see, e.g., FIG. 3). Thus, since the discharge of the vapor from the inside of the evaporator 12 is further facilitated, an excessive pressure increase within the evaporator 12 may be efficiently reduced. Thus, the cooling performance for the electronic part 104 may be further improved.

In the cooling system 10, since the excessive pressure increase within the evaporator 12 is reduced, the increase of the boiling point of the coolant 34 within the evaporator may be reduced. Thus, the evaporation amount of the coolant 34 may be secured, and thus, the cooling performance for the electronic part 104 may be improved.

In the cooling system 10, the electronic part 104 is cooled using latent heat when the coolant 34 is vaporized in the evaporator 12. Thus, since the increase of the boiling point of the coolant 34 within the evaporator 12 may be reduced, and the evaporation amount of the coolant 34 may be secured, the cooling performance for the electronic part 104 may be efficiently improved.

Figure 6:
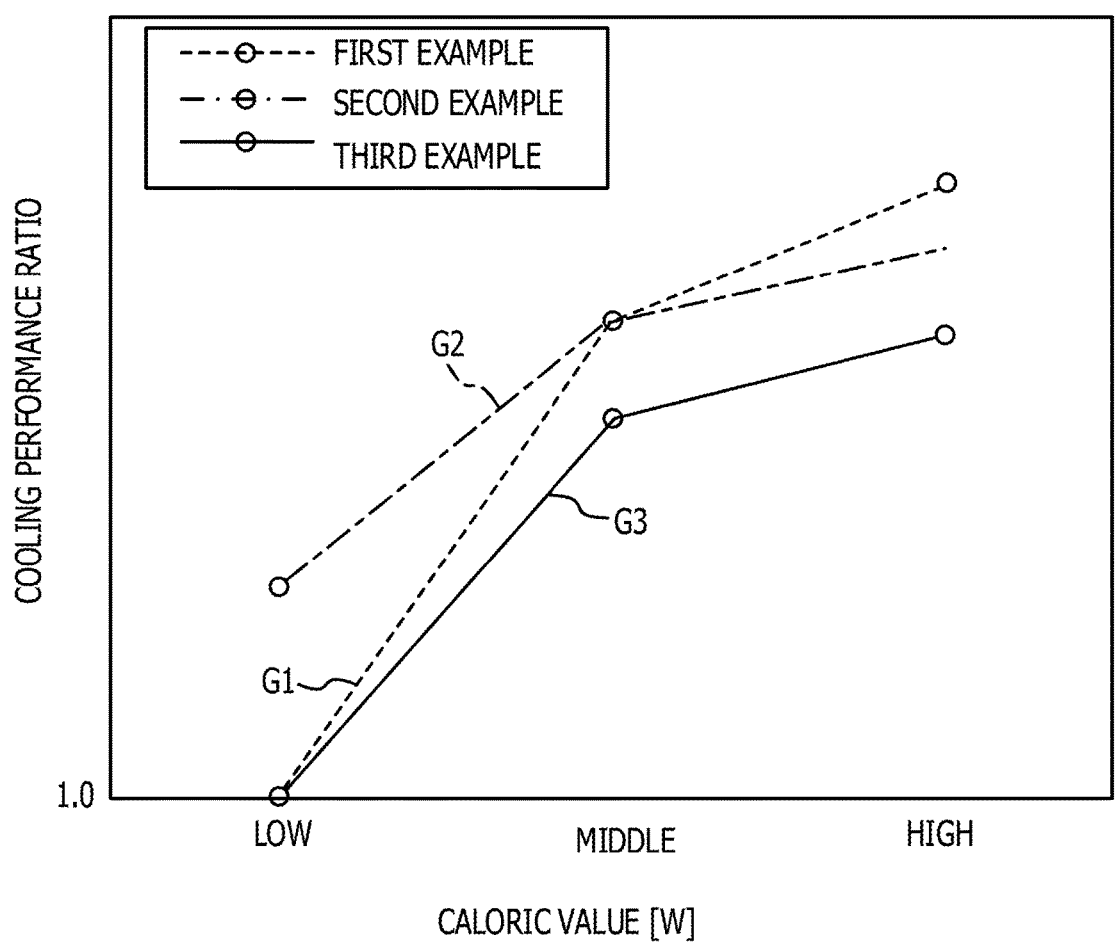
FIG. 6 illustrates an exemplary relationship between a calorific value of a heat generating element and a cooling performance ratio of a cooling system.

FIG. 6 illustrates an exemplary relationship between a calorific value of a heat generating element and a cooling performance ratio of a cooling system. The horizontal axis in FIG. 6 represents calorific value [W] of a heat generating element corresponding to the electronic part 104. The vertical axis in FIG. 6 represents a cooling performance ratio. The cooling performance ratio may be calculated by assuming that the cooling performance of the cooling system of a third example which corresponds to a case where the calorific value of the heat generating element is "low," is 1.0. As the numerical value of the cooling performance ratio increases, the cooling performance increases. Graphs G1 to G3 correspond to cooling systems of first to third examples, respectively.

The cooling system of the first example represented by Graph G1 corresponds to a state where the pressure control valve 60 has remained opened from the initiation of the heat generation of the heat generating element in the cooling system 10 described above. The cooling system of the second example represented by Graph G2 corresponds to a state where the pressure control valve 60 has remained closed from the initiation of the heat generation of the heat generating element in the cooling system 10 described above.

The cooling system of the third example represented by Graph G3 corresponds to a structure in which in the cooling system 10 described above, the bypass pipe 20 is omitted and the feed pipe body 40 has the same inner diameter as that of the opening portion 38 over the entire length thereof in the longitudinal direction.

As illustrated in FIG. 6, when the calorific value of the heat generating element is "low," the cooling system of the first example represented by Graph G1 and the cooling system of the third example represented by Graph G3 have substantially the same cooling performance ratio. However, when the calorific value of the heat generating element is "middle" or "high," the cooling performance ratio of the first example represented by Graph G1 is higher than the cooling performance ratio of the cooling system of the third example represented by Graph G3.

Even in a case where the calorific value of the heat generating element is any one of "low," "middle," and "high," the cooling performance ratio of the cooling system of the second example represented by Graph G2 is higher than the cooling performance ratio of the cooling system of the third example represented by Graph G3.

When the calorific value of the heat generating element is "low," the cooling performance ratio of the cooling system of the second example represented by Graph G2 is higher than the cooling performance ratio of the cooling system of the first example represented by Graph G1. When the calorific value of the heat generating element becomes "middle," the cooling system of the first example represented by Graph G1 and the cooling system of the second example represented by Graph G2 have substantially the same cooling performance ratio. When the calorific value of the heat generating element is "high," the cooling performance ratio of the first example represented by Graph G1 is higher than the cooling performance ratio of the cooling system of the second example represented by Graph G2.

In the cooling system 10, the working pressure at the time when the pressure control valve 60 operates is set based on the relationship represented in FIG. 6. For example, in the cooling system 10, the working pressure at the time when the pressure control valve 60 operates may be set to a value at the time when the calorific value of the heat generating element becomes "middle." The setting of the working pressure may be performed by adjusting the elastic modulus of the elastic member that biases the valve body 64.

By the setting of the working pressure, in the cooling system 10, the pressure control valve 60 remains closed in the state where the calorific value of the electronic part 104 is lower than "middle." In the state where the calorific value of the electronic part 104 is higher than "middle," the pressure control valve 60 is opened.

Accordingly, in the cooling system 10, in the state where the calorific value of the electronic part 104 is lower than "middle," the cooling performance ratio represented by Graph G2 in FIG. 6 may be secured. In the state where the calorific value of the electronic part 104 is higher than "middle," the cooling performance ratio represented by Graph G1 in FIG. 6 is secured. Thus, in the entire region from a state where the calorific value of the electronic part 104 is low to a state where the calorific value of the electronic part is high, a high cooling performance may be maintained with respect to the electronic part 104.

For example, in the cooling system 10, as illustrated in FIG. 1 or FIG. 2, the expansion portion 46 is formed at the evaporator 12 side rather than in the central portion in the longitudinal direction of the feed pipe body 40. Thus, when the vapor discharged from the evaporator 12 moves toward the expansion portion 46, the cooling and being liquefied of the vapor is reduced. Thus, since more vapor moves in the expansion portion 46, the discharge of the vapor from the inside of the evaporator 12 is facilitated so that the pressure within the evaporator 12 may be reduced.

The expansion portion 46 is formed in a portion of the feed pipe body 40 in the longitudinal direction. Thus, as compared to, for example, a case where the expansion portion 46 is formed over the entire length of the feed pipe body 40, the feed pipe body 40 may be miniaturized, and further, the cooling system 10 may be miniaturized.

The feed pipe body 40 includes a straight portion 52 extending in a linear shape and a bent portion 54 which bents, in which the expansion portion 46 is formed in the straight portion 52, and the bent portion 54 is formed in the general portion 48. Thus, as compared with, for example, a case in which the bent portion 54 is formed in the expansion portion 46, a bending processing of the bent portion 54 becomes easy to perform so that the costs may be reduced.

Figure 7:
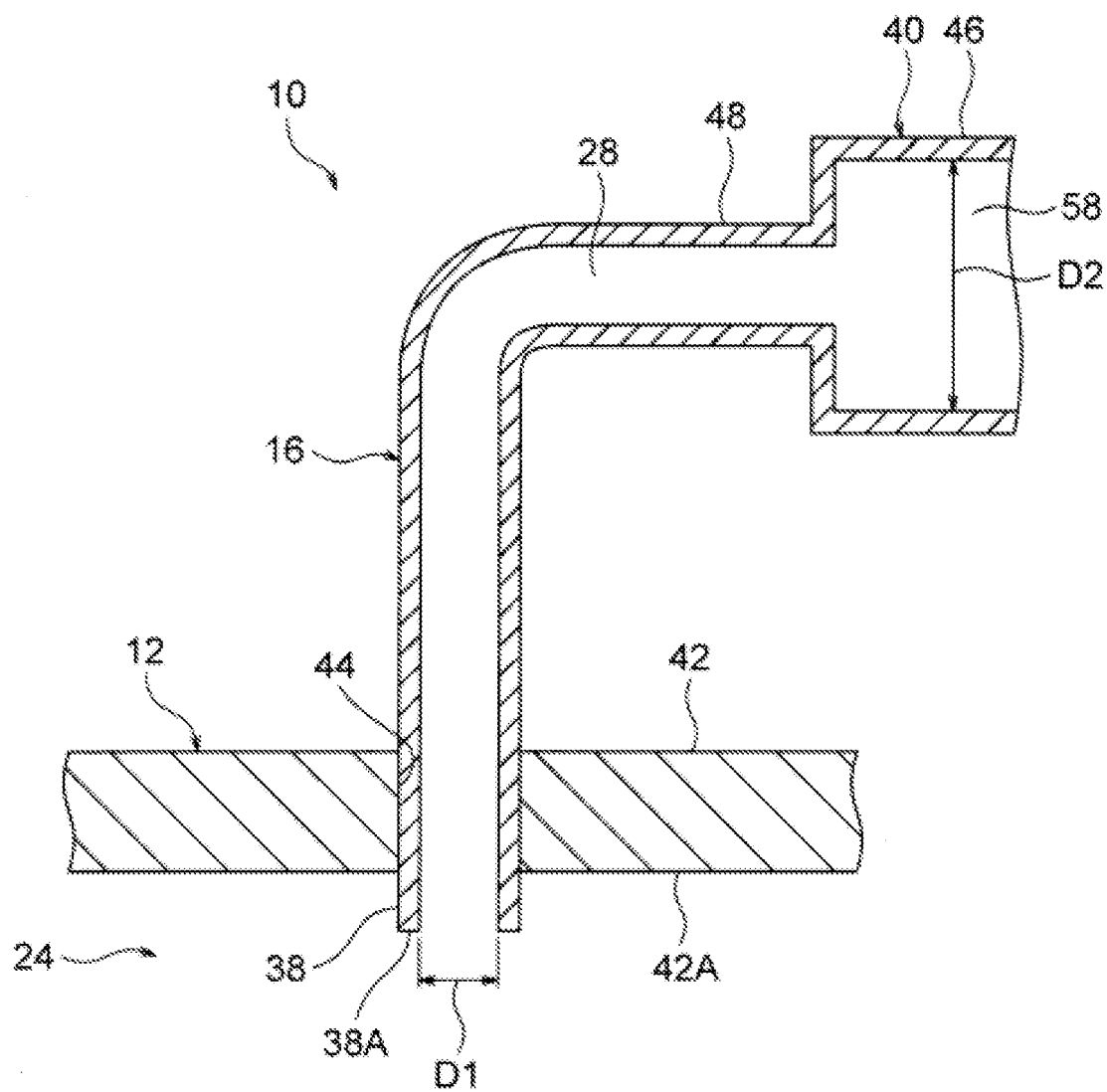
FIG. 7 illustrates an exemplary vertical cross-sectional view of a feed pipe.

As illustrated in FIG. 3, the front end 38A of the opening portion 38 is coplanar with the inner face 42A of the top wall portion 42. FIG. 7 is an exemplary vertical cross-sectional view of a feed pipe. For example, as illustrated in FIG. 7, a portion of the opening portion 38 on a front end 38A side may protrude to the evaporation chamber 24 side with respect to the inner face 42A of the top wall portion 42.

Figure 8:
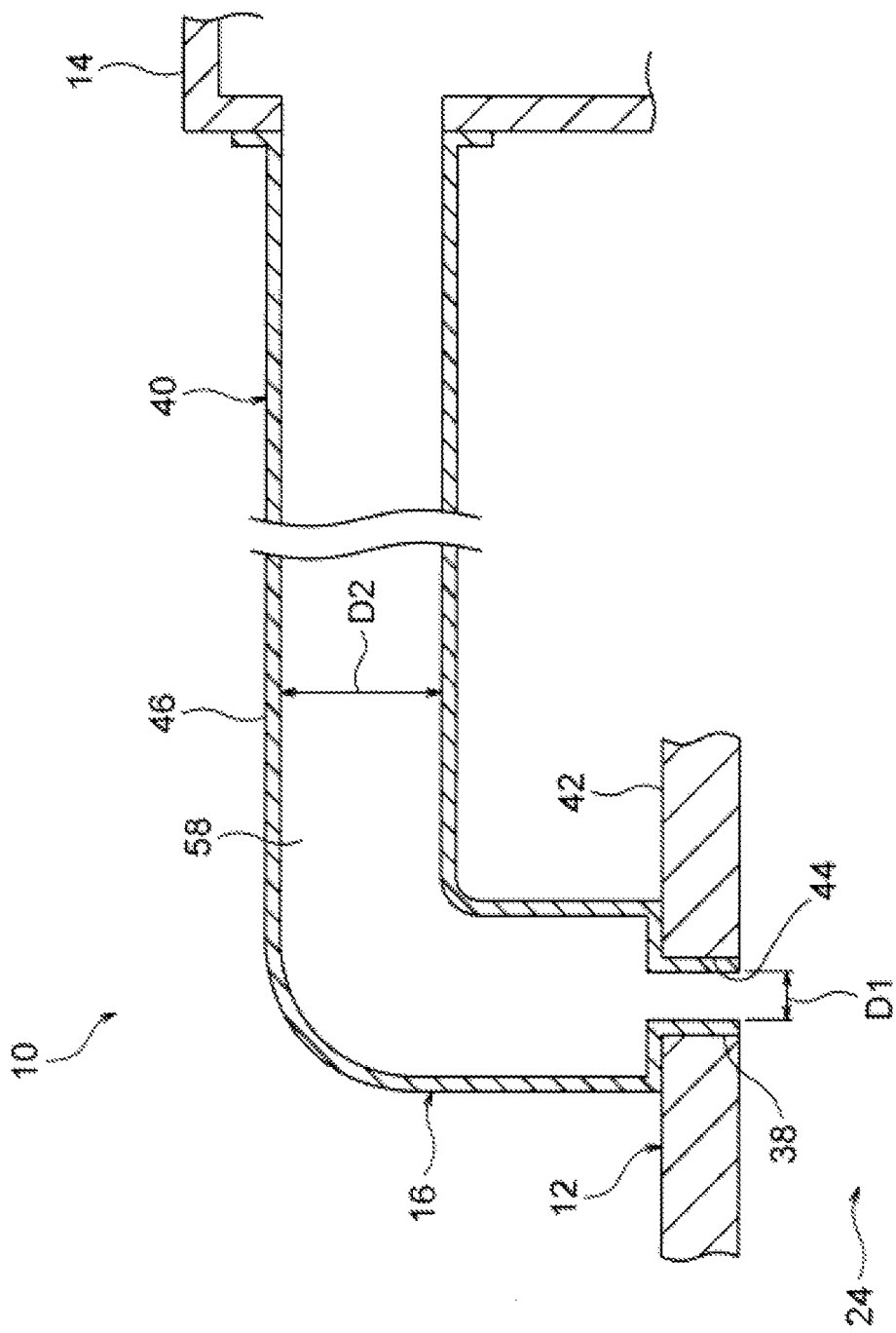
FIG. 8 illustrates an exemplary vertical cross-sectional view of a feed pipe.

As illustrated in FIG. 3, the feed pipe body 40 includes an expansion portion 46 and general portions 48 and 50. FIG. 8 is an exemplary vertical cross-sectional view of a feed pipe. For example, as illustrated in FIG. 8, the feed pipe body 40 may have an inner diameter larger than that of the opening portion 38 over the entire length thereof in the longitudinal direction. For example, the expansion portion 46 may be formed over the entire length of the feed pipe body 40 in the longitudinal direction.

Figure 9:
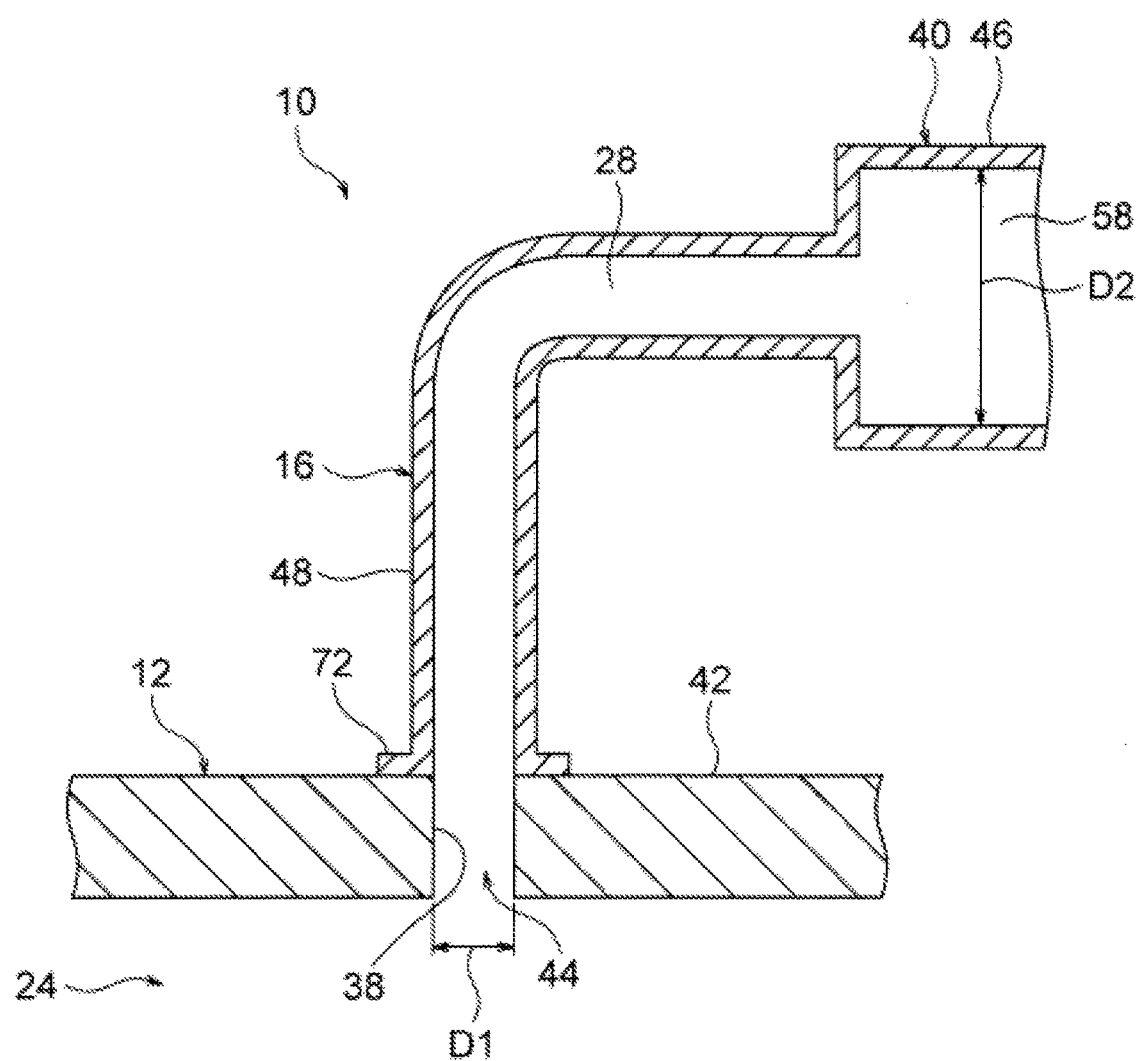
FIG. 9 illustrates an exemplary vertical cross-sectional view of a feed pipe.

As illustrated in FIG. 3, the feed pipe 16 includes an opening portion 38 in addition to the feed pipe body 40. FIG. 9 illustrates an exemplary vertical cross-sectional view of a feed pipe. For example, as illustrated in FIG. 9, the opening portion 38 may not be formed in the feed pipe body 40, but formed in the evaporator 12.

For example, in FIG. 9, the opening portion 38 is formed in the inner peripheral portion of the communication hole 44 formed in the top wall portion 42 of the evaporator 12, and the communication hole 44 is formed inside the opening portion 38. In FIG. 9, the feed pipe 16 has a flange 72 formed on an end of the feed pipe body 40 on the evaporator 12 side end. The feed pipe body 40 is fixed to the evaporator 12 via the flange 72, and the general portion 48 of the feed pipe body 40 on the evaporator 12 side is coupled with the opening portion 38. In FIG. 9, the general portion 48 may have an inner diameter which is substantially the same as that of the opening portion 38.

Figure 10:
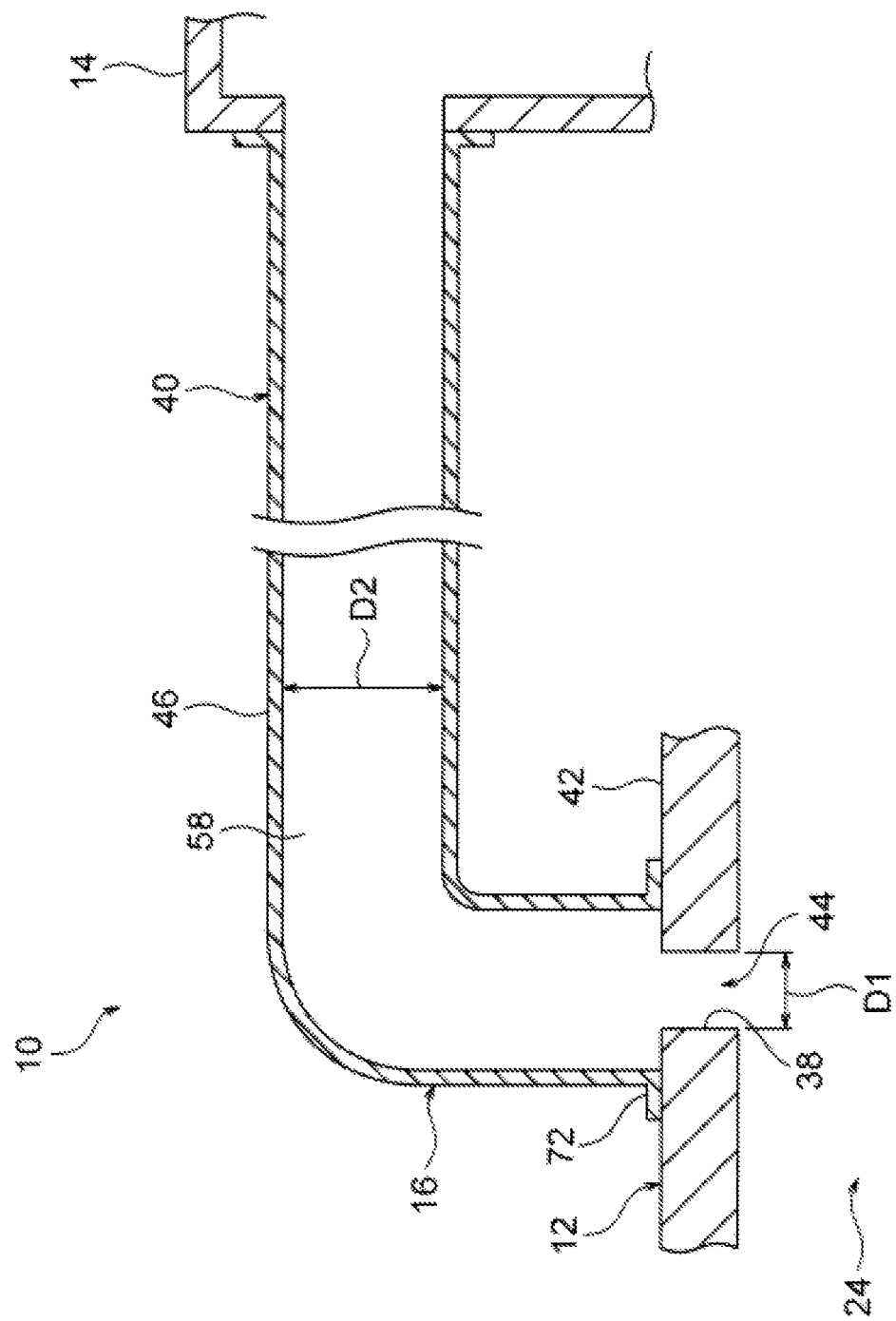
FIG. 10 illustrates an exemplary vertical cross-sectional view of a feed pipe.

FIG. 10 illustrates an exemplary vertical cross-sectional view of a feed pipe. For example, as illustrated in FIG. 9, after the opening portion 38 is formed in the evaporator 12, the feed pipe body 40 may have an inner diameter larger than that of the opening portion 38 over the entire length thereof in the longitudinal direction, as illustrated in FIG. 10. For example, in FIG. 10, the feed pipe 16 includes an expansion portion 46 that forms the feed pipe body 40, and a flange 72.

Figure 11:
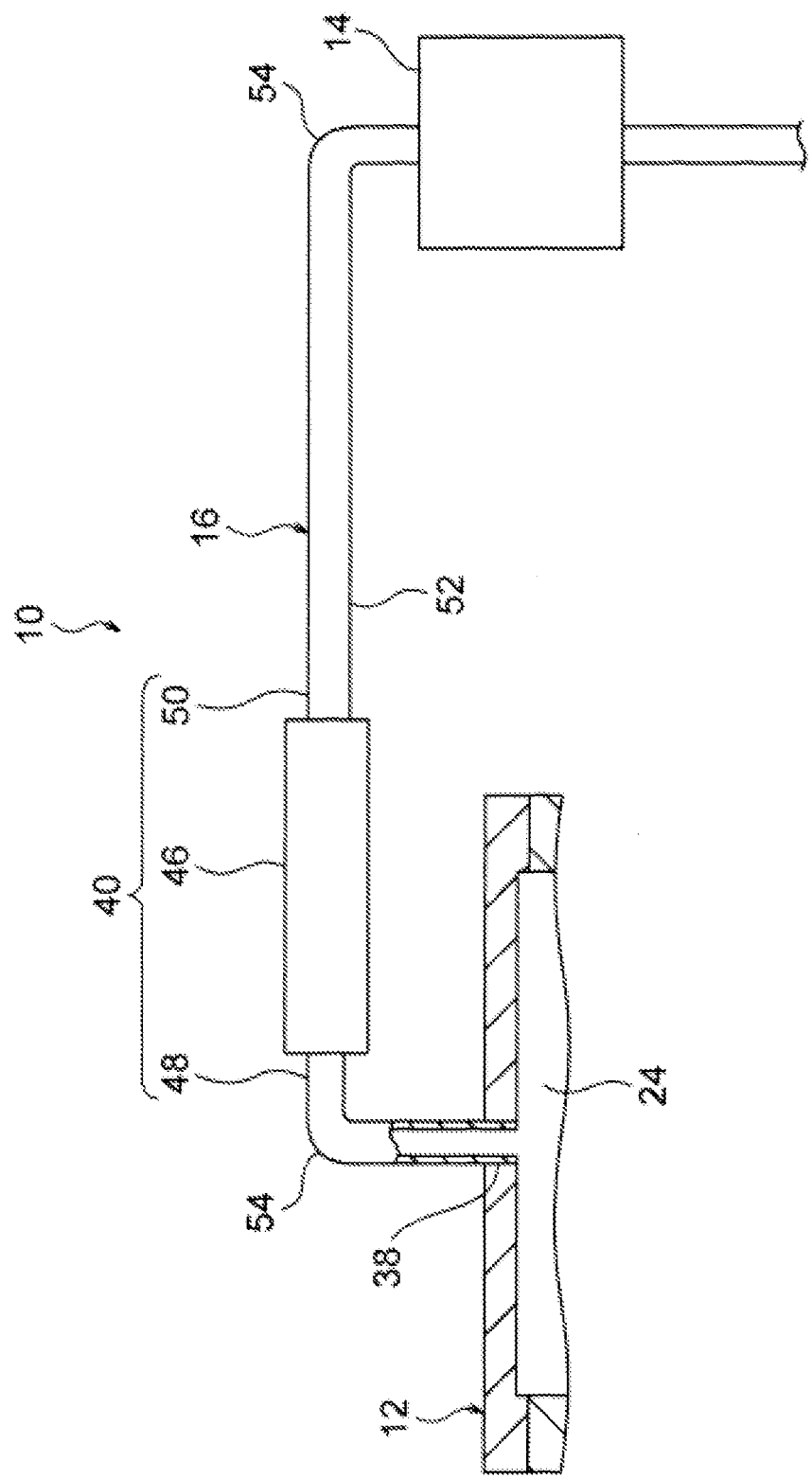
FIG. 11 illustrates an exemplary vertical cross-sectional view of a feed pipe.

FIG. 11 is an exemplary cross-sectional view of a feed pipe. For example, as illustrated in FIG. 11, a bent portion 54 may also be formed in the general portion 50 of the feed pipe body on the condenser 14 side, in addition to the general portion 48 of the feed pipe body 40 on the evaporator 12 side. In the feed pipe body 40 including the bent portions 54 formed in the general portions 48 and 50 and the straight portion 52, the expansion portion 46 may be formed in the straight portion 52.

FIGS. 12 to 15 illustrate exemplary vertical cross-sectional views of expansion portions. As illustrated in FIGS. 12 to 15, the external appearance of the tubular expansion portion 46 may be formed in various shapes. According to the change of the external appearance of the expansion portion 46, the inner space 58 of the expansion portion 46 may be formed as follows, for example.

Figure 12:
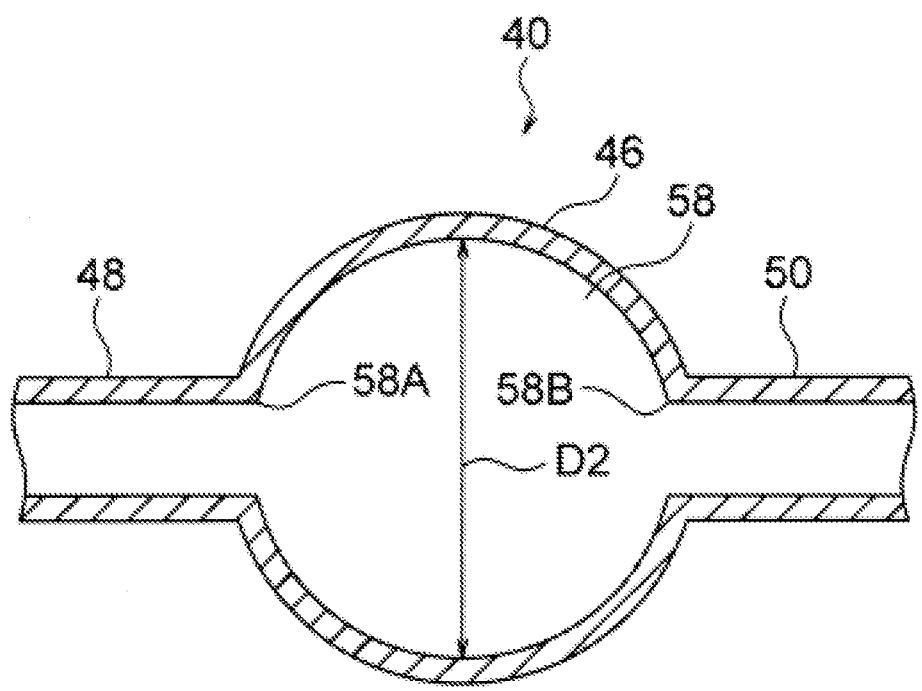
FIG. 12 illustrates an exemplary vertical cross-sectional view of an expansion portion.
Figure 13:
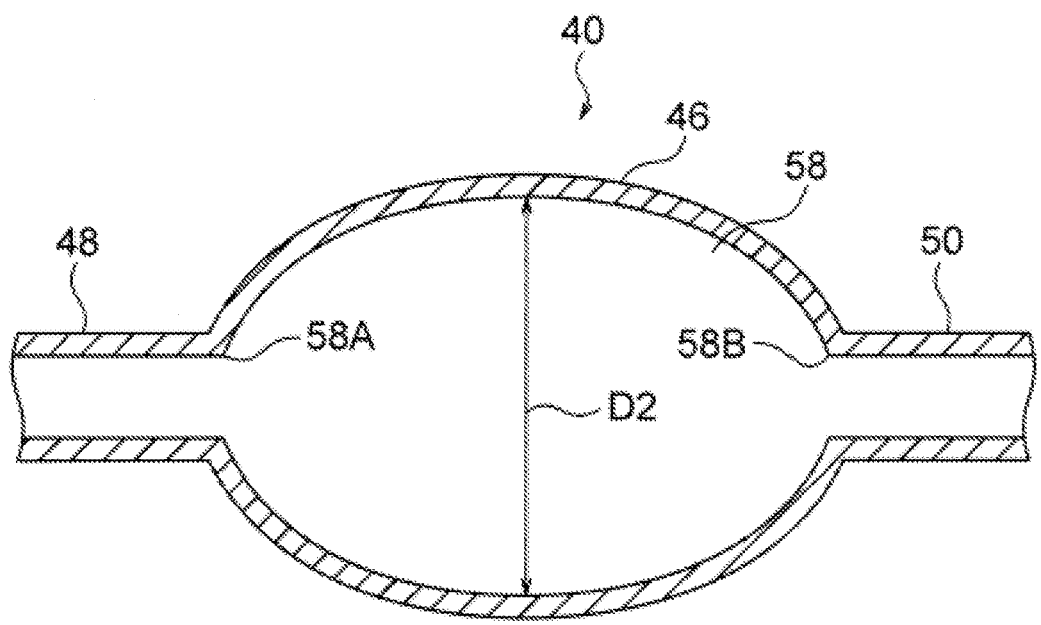
FIG. 13 illustrates an exemplary vertical cross-sectional view of an expansion portion.
Figure 14:
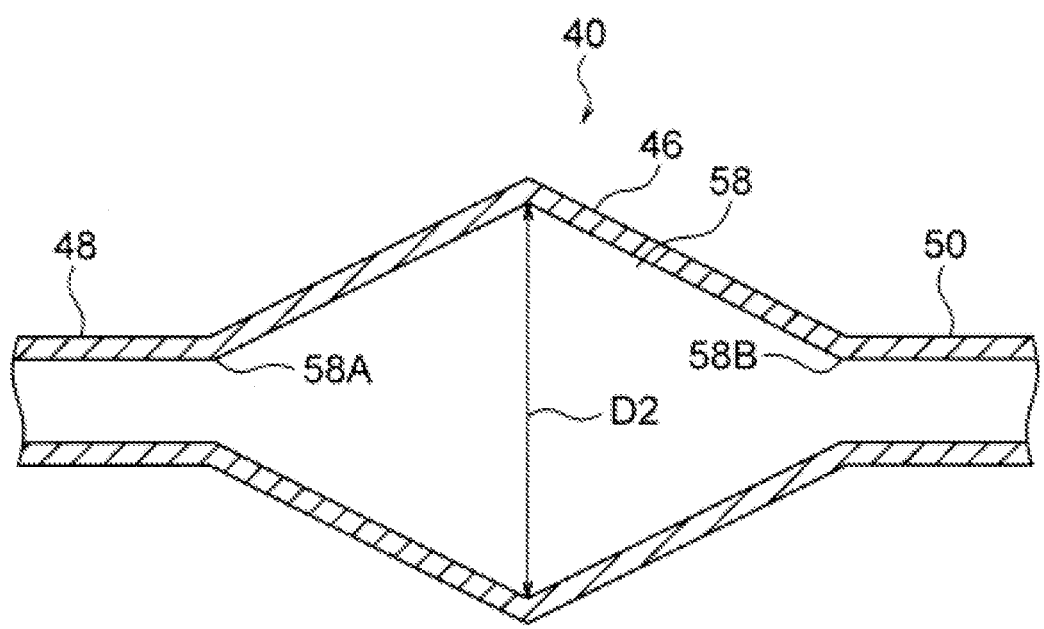
FIG. 14 illustrates an exemplary vertical cross-sectional view of an expansion portion.

For example, in FIG. 12, the external appearance of the expansion portion 46 and the inner space 58 of expansion portion 46 are formed in a cross-sectional circular shape when viewed from a side (a spherical shape). In FIG. 13, the external appearance of the expansion portion 46 and the inner space 58 of the expansion portion 46 are formed in a cross-sectional elliptical shape when viewed from a side. In FIG. 14, the external appearance of the expansion portion 46 and the inner space 58 of the expansion portion 46 are formed in a cross-sectional diamond shape when viewed from a side.

In FIGS. 12 to 14, a space on an inlet 58A side of the inner space 58 of the expansion portion 46 is enlarged as it goes away from the inlet 58A, and a space on the an outlet 58B side of the inner space 58 of the expansion portion 46 is reduced as it becomes near the outlet 58B.

Figure 15:
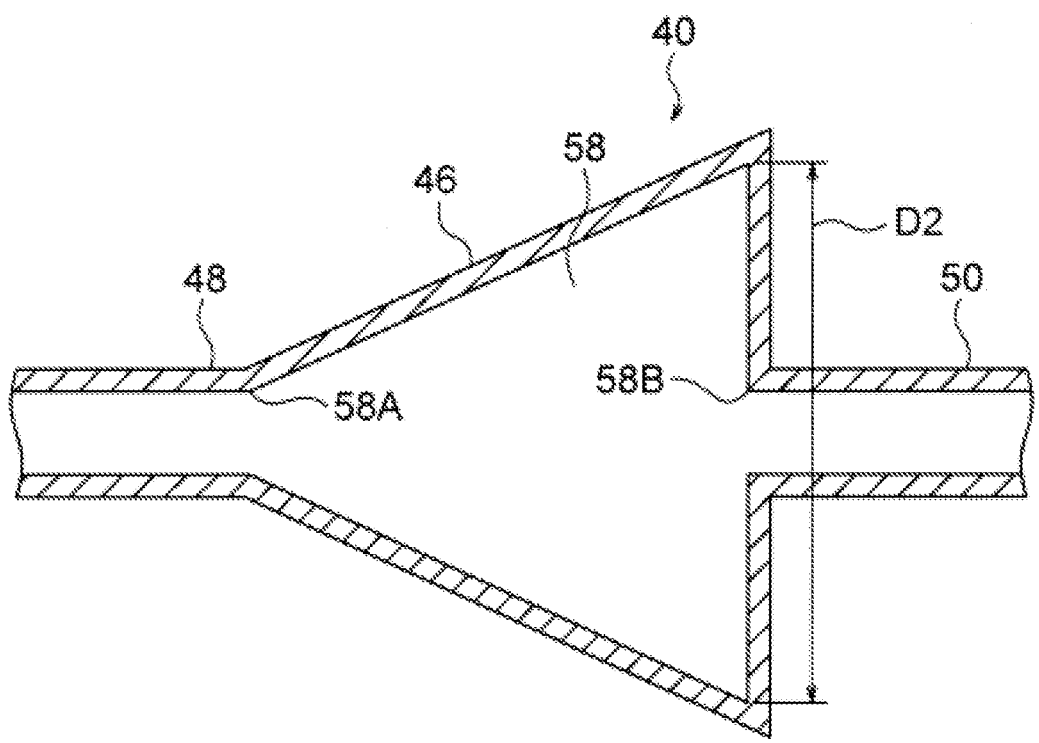
FIG. 15 illustrates an exemplary vertical cross-sectional view of an expansion portion.
Figure 16:
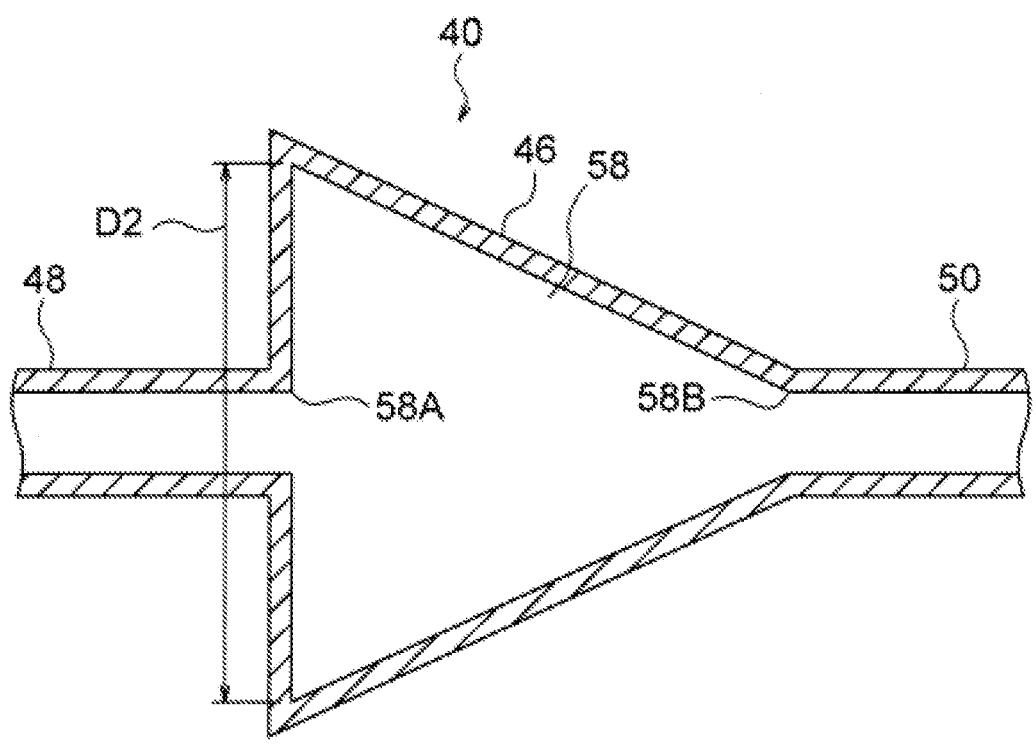
FIG. 16 illustrates an exemplary vertical cross-sectional view of an expansion portion.

In FIGS. 15 and 16, the external appearance of the expansion portion 46 and the inner space 58 of the expansion portion 46 are formed in a cross-sectional triangular shape when viewed from a side. In FIG. 15, the inner space 58 of the expansion portion 46 is enlarged as it goes away from the inlet 58A. In FIG. 16, the inner space 58 of the expansion portion 46 is reduced as it becomes near the outlet 58B.

In FIGS. 12 to 15, at least the space on an inlet 58A side of the inner space 58 of the expansion portion 46 is enlarged as it goes away from the inlet 58A. Thus, generation of turbulence in the vicinity of the inlet 58A of the inner space 58 may be reduced.

In FIGS. 12 to 14 and FIG. 16, at least the space on the outlet 58B side of the inner space 58 of the expansion portion 46 is reduced as it becomes near the outlet 58B. Thus, the generation of turbulence in the vicinity of the outlet 58B of the inner space 58 may be reduced.

As illustrated in FIGS. 12 to 15, when the inner diameter of the expansion portion 46 varies in the longitudinal direction of the expansion portion 46, the diameter at a location where the expansion portion 46 has the largest diameter (the maximum inner diameter) may become the inner diameter D2 of the expansion portion 46.

As illustrated in FIG. 3, the opening portion 38 may be formed in a linear shape to have a constant inner diameter. However, for example, the inside of the opening portion 38 may be formed in a tapered shape so that the diameter is enlarged as it goes away from the evaporation chamber 24. The end on the evaporator 12 side of the inner peripheral surface of the opening portion 38 may be chamfered or fillet-worked. In this way, the inner diameter of the opening portion 38 may vary in the longitudinal direction of the opening portion 38.

When the inner diameter of the opening portion 38 varies in the longitudinal direction of the opening portion 38, the inner diameter D1 of the opening portion 38 may be an opening diameter of the opening portion 38 directed to the inside of the evaporator 12, and may be a minimum inner diameter or a maximum inner diameter of the opening portion 38. For example, even in the case where the inner diameter of the opening portion 38 varies in the longitudinal direction of the opening portion 38, the inner diameter D2 of the expansion portion 46 may be larger than the inner diameter at any location in the opening portion 38.

As illustrated in FIG. 4, the bypass pipe 20 may couple the evaporator 12 and the expansion portion 46 with each other. However, the bypass pipe 20 may couple the evaporator 12 and any one of the general portions 48 and 50 with each other.

The cooling system 10 may be provided with an electromagnetic valve serving as the pressure control valve 60. In a state where the calorific value of the electronic part 104 is smaller than "middle," the pressure control valve 60 may be closed, and in a state where the calorific value of the electronic part 104 is larger than "middle," the pressure control valve 60 may be controlled to be opened by a control circuit.

The inside of the opening portion 38 and the feed pipe body 40 may be formed such that the cross section orthogonal to the longitudinal direction of the feed pipe 16 has a circular shape (a cross-sectional circular shape). The inside of the opening portion 38 and the feed pipe body 40 may be formed in a shape other than the cross-sectional circular shape such as, in a cross-sectional rectangular shape. In the case where the inside of the opening portion 38 and the feed pipe body 40 is formed in a shape other than the cross-sectional circular shape, the expansion portion 46 may have an inner cross-sectional area larger than the opening portion 38, and the general portions 48 and 50 may have an inner cross-sectional area smaller than the expansion portion 46. More preferably, the inside of the general portions 48 and 50 may have a cross-sectional shape which is substantially the same as that of the inside of the opening portion 38, and may have a cross-sectional area which is substantially the same as that of the inside of the opening portion 38.

The opening portion 38 and the general portions 48 and 50 may be formed in a cylindrical shape or a circular tube shape. The expansion portion 46 may be formed in a shape other than the cylindrical shape or the circular tube shape such as, in a hollow rectangular parallelopiped shape.

As illustrated in FIG. 2, the evaporator 12 and the condenser 14 may be arranged side by side in the horizontal direction. The evaporator 12 and the condenser 14 may also be arranged side by side in the vertical direction.

The condenser 14 may be disposed at a position slightly higher than the evaporator 12 in the vertical direction. The condenser 14 and the evaporator 12 may be positioned at the substantially same height in the vertical direction.

In the cooling system 10, the coolant 34 is naturally circulated between the evaporator 12 and the condenser 14 without using a pump. However, at least one of the feed pipe 16 and a vapor pipe is provided with a pump, and the coolant 34 may be circulated between the evaporator 12 and the condenser 14 using the power of the pump.

The electronic part 104 serving as a cooling target of the cooling system 10 may be a central processing unit (CPU) or a semiconductor element other than the CPU.

The cooling target of the cooling system 10 may be the electronic part 104 or a heat generating element other than the electronic part 104.

Although the cooling system 10 is mounted on the electronic device 100, the cooling system 10 may also be mounted on an object other than the electronic device 100.

The electronic device 100 may be a server or an object other than the server.

Various feed pipes or various expansion portions described above may be properly combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A cooling system comprising:
    an evaporator including a first surface which faces an electronic part and a second surface opposite to the first surface;
    a condenser;
    a feed pipe including a feed pipe body configured to couple an opening portion which is provided at the second surface of the evaporator and within the evaporator and the condenser, at least a portion of the feed pipe body in a longitudinal direction having an inner cross-sectional area larger than an inner cross-sectional area of the opening portion;
    a return pipe configured to couple the condenser and the second surface of the evaporator; and
    a bypass pipe configured to couple the second surface of the evaporator and the feed pipe body,
    wherein the feed pipe includes an expansion portion having an inner cross-sectional area larger than the inner cross-sectional area of the opening portion, and a general portion having an inner cross-sectional area smaller than the inner cross-sectional area of the expansion portion.

2. The cooling system according to claim 1, wherein the expansion portion is formed on a side of the evaporator rather than in a central portion of the feed pipe in the longitudinal direction.

3. The cooling system according to claim 1, wherein the feed pipe body includes a straight portion extending in a linear shape, and a bent portion, the expansion portion is formed in the straight portion, and the bent portion is formed in the general portion.

4. The cooling system according to claim 1, wherein the bypass pipe couples the evaporator and the expansion portion.

5. The cooling system according to claim 1, further comprising a pressure control valve provided on the bypass pipe.

6. The cooling system according to claim 1, wherein an inside of the opening portion and the feed pipe body is formed in a cross-sectional circular shape, and at least a portion of the feed pipe body in the longitudinal direction has an inner diameter larger than the inner diameter of the opening portion.

7. The cooling system according to claim 1, wherein the evaporator includes an evaporation chamber and a communication hole configured to communicate with the evaporation chamber, and the opening portion is inserted into the communication hole.

8. The cooling system according to claim 1, wherein the inner cross-sectional area of the feed pipe body is larger than the inner cross-sectional area of the opening portion over an entire length of the feed pipe body in the longitudinal direction.

9. The cooling system according to claim 1, wherein the feed pipe body includes an expansion portion having an inner cross-sectional area larger than the inner cross-sectional area of the opening portion, and a general portion having an inner cross-sectional area larger than the inner cross-sectional area of the expansion portion, and at least a space on a side of an inlet in an inner space of the expansion portion is enlarged as going away from the inlet.

10. The cooling system according to claim 1, wherein the feed pipe body includes an expansion portion having an inner cross-sectional area larger than the inner cross-sectional area of the opening portion, and a general portion having an inner cross-sectional area larger than the inner cross-sectional area of the expansion portion, and at least a space on a side of an outlet in an inner space of the expansion portion is reduced as becoming near the outlet.

11. An electronic device comprising:
a heat generating element;
an evaporator thermally coupled with the heat generating element and including a first surface which faces the heat generating element and a second surface opposite to the first surface;
a condenser;
a feed pipe including a feed pipe body configured to couple an opening portion which is provided at the second surface of the evaporator and is opened within the evaporator and the condenser, at least a portion of the feed pipe body in a longitudinal direction having an inner cross-sectional area larger than an inner cross-sectional area of the opening portion;
a return pipe configured to couple the condenser and the second surface of the evaporator; and
a bypass pipe configured to couple the second surface of the evaporator and the feed pipe body, wherein the feed pipe includes an expansion portion having an inner cross-sectional area larger than the inner cross-sectional area of the opening portion, and a general portion having an inner cross-sectional area smaller than the inner cross-sectional area of the expansion portion.

12. The electronic device according to claim 11, wherein the heat generating element is an electronic part, and the electronic device is a server.

13. The electronic device according to claim 11, wherein the expansion portion is formed on a side of the evaporator rather than in a central portion of the feed pipe in the longitudinal direction.

14. The electronic device according to claim 11, wherein the feed pipe body includes a straight portion extending in a linear shape, and a bent portion, the expansion portion is formed in the straight portion, and the bent portion is formed in the general portion.

15. The electronic device according to claim 11, wherein the bypass pipe couples the evaporator and the expansion portion.

16. The electronic device according to claim 11, further comprising a pressure control valve provided on the bypass pipe.

17. The electronic device according to claim 11, wherein an inside of the opening portion and the feed pipe body is formed in a cross-sectional circular shape, and at least a portion of the feed pipe body in the longitudinal direction has an inner diameter larger than the inner diameter of the opening portion.

18. The electronic device according to claim 11, wherein the evaporator includes an evaporation chamber and a communication hole configured to communicate with the evaporation chamber, and the opening portion is inserted into the communication hole.

* * * * *